United States Patent Office 3,689,377
Patented Sept. 5, 1972

3,689,377
EXTRACTIVE DISTILLATION OF ACRYLONITRILE FROM ACETONITRILE USING WATER
Alexander F. MacLean and Adin L. Stautzenberger, Corpus Christi, Tex., assignors to Celanese Corporation of America, New York, N.Y.
No Drawing. Continuation-in-part of applications Ser. No. 796,744, Mar. 3, 1959, and Ser. No. 480,260, Aug. 17, 1965, which are continuations-in-part of applications Ser. No. 256,368, Nov. 14, 1951, and Ser. No. 565,543, Feb. 15, 1956. This application Apr. 7, 1966, Ser. No. 540,810
Int. Cl. B01d 3/40; C07c 121/32
U.S. Cl. 203—96
6 Claims This application is a continuation-in-part of applications Ser. No. 480,260, filed Aug. 17, 1965, and 796,744, filed Mar. 3, 1959, which are continuations-in-part of applications Ser. No. 256,368, filed Nov. 14, 1951, and 565,543, filed Feb. 15, 1956.

This invention relates to the purification of acrylonitrile and relates more particularly to the purification of acrylonitrile by distillation operations.

An object of this invention is the provision of an improved process for the separation of undesirable impurities from acrylonitrile.

Another object of this invention is to provide an efficient and economical process for the purification of acrylonitrile by extractive distillation operations.

Other objects of this invention will appear from the following detailed description.

Several methods may be employed for the production of acrylonitrile. One of the processes employed industrially involves the steps of condensing acetaldehyde and hydrogen cyanide to form lactonitrile, acetylating the free hydroxy group of the lactonitrile with acetic anhydride and then subjecting the ester to pyrolysis. The crude acrylonitrile obtained by this process contains acetic acid, hydrogen cyanide, acetone and acetonitrile and these impurities must be removed. A straight fractional distillation serves to separate most of the impurities. However, the partly purified acrylonitrile usually contains some acetonitrile and, since the boiling point of acrylonitrile is only slightly below that of acetonitrile, the separation of these compounds by ordinary fractional distillation is quite impractical.

We have now found that the acetonitrile present in a mixture of acrylonitrile and acetonitrile may be substantially reduced in amount if the mixture of acetonitrile and acrylonitrile is subjected to an extractive distillation employing water as the extractant. By this novel distillation process, the acetonitrile content of the distillate may be readily reduced to an amount of 1% by weight or less.

In describing extractive distillation processes those skilled in the art often refer to the extractant as "the solvent." Chemical Engineer's Handbook by John H. Perry, 3rd edition, 1950, p. 655 says, "In extractive distillation the required solvent concentration is maintained by introducing the solvent at a point near the top of the column, and because of its nonvolatility it is found in high concentrations on all plates." Patterson et al. U.S. Pat. No. 2,426,705 of Sept. 2, 1947 states, "In extractive distillation, however, as distinct from azeotropic distillation, the added liquid is employed in substantially greater amounts in order to exert the maximum effect upon certain groups of compounds. The amount of added liquid employed in an extractive distillation is greatly in excess of that which would form with the mixture as a whole azeotropic mixtures of the constituents thereof." In our process as will be seen, a preponderant amount (more than 50%) by weight of the added liquid water (i.e. the "solvent" or "extractant") is present in the liquid phase in the column, e.g. an amount above 90 mole percent. This amount is greatly in excess of that which would form azeotropic mixtures with the constituents of the feedstock.

Also, it is well known that in extractive distillation the solvent is taken from the bottom of the main column" (Perry, previously cited). In our process, as will be seen, the residue from the base of the extractive distillation zone is preponderantly water (i.e. in concentration of over 90 mole percent) and by far the largest portion of the water charged to the column, e.g. over 90 percent thereof, is removed from the base of the extractive distillation zone.

In carrying out our novel water extractive distillation, the mixture of acetonitrile and acrylonitrile to be separated is introduced as a vapor at the base of a suitable fractionating column and water is introduced at the top. The fractionating column employed may be provided with bubble cap trays or with packing so as to insure satisfactory vapor-liquid contact. Sufficient heat is supplied to the column through a reboiler to maintain the temperature in the reboiler at about 85° C. The maintenance of this temperature avoids any condensation of acrylonitrile and the formation of an acrylonitrile liquid phase in the column. The water is introduced into the column at a rate sufficient to maintain the water concentration in the liquid phase above about 93% by weight, preferably about 93 to 98% by weight. Low reflux ratios are satisfactory and the reflux ratio employed may be from 0.07 to 0.2 to one. The temperature of the column below the water feed point is maintained at at least 71° C. to prevent the appearance in the column below the water feed point of an acrylonitrile liquid phase in the column.

The distillate of the extractive distillation separates into two phases on condensation, an upper acrylonitrile phase containing a small amount of water, and a lower aqueous phase. The lower aqueous phase contains a small amount of acrylonitrile and is returned as reflux to the fractionating column. The upper acrylonitrile phase may be distilled in a separate distillation step in order to remove the water present. The residue from the fractionating column in which the initial water extractive distillation is carried out is essentially water but contains some acrylonitrile and the acetonitrile.

In order further to illustrate the novel process of our invention, but without being limited thereto, the following example is given:

EXAMPLE 404 parts by weight per minute of a mixture containing 3% by weight of water, 3% by weight of acetonitrile and 94% by weight of acrylonitrile are fed as vapor to the second tray from the bottom of a third tray perforated plate distilling column provided with a reboiler, while 1600 parts by weight per minute of water heated to a temperature of 70–80° C. are fed to the second tray from the top of the column. Sufficient heat is supplied to the reboiler to maintain the reboiler temperature at about 85° C. The liquid temperature in the column below the water feed point is maintained at about 71° C. The acrylonitrile vapors rise through the column and the acetonitrile becomes enriched in the liquid phase because of its greater solubility in water. The vapor from the column is condensed and the condensate separates out into two phases. The upper phase taken off at a rate of 345 parts per minute is the acrylonitrile phase and contains 95.5% by weight of acrylonitrile, 3.5% by weight of water and less than 1.0% by weight of acetonitrile. The water may be removed from the acrylonitrile phase by distilling the same in a separate fractional distillation operation. The acrylonitrile thus obtained contains 1.0% by weight of acetonitrile.

The lower aqueous phase contains 93% by weight of water, 0.2% by weight of acetonitrile and about 7% by weight of acrylonitrile. The lower phase amounts to about 40 parts by weight per minute and is returned to the column as reflux, the reflux ratio which is thus maintained by return of the aqueous phase being about 0.1 to 1. The residue of the water extractive distillation is removed from the reboiler of the column at a rate of 1659 parts by weight per minute. The aqueous residue contains 96.6% by weight of water, 0.4% by weight of acetonitrile and 2.3% by weight of acrylonitrile. The column residue is distilled in a conventional column to recover the acrylonitrile as distillate and remove the greater part of the acetonitrile from the column base. The distillate containing about 3% acetonitrile is recycled.

It is to be understood that the foregoing detailed description is given merely by way of illustration and that many variations may be made therein without departing from the spirit of our invention.

The embodiments of the invention in which an exclusive property or privilege is claimed are defined as follows:

1. A process for the purification of acrylonitrile containing acetonitrile as an impurity which comprises feeding the impure acrylonitrile into a fractionating column, introducing sufficient water into said column at a point above the point of introduction of the acrylonitrile to provide between about 93 and 98 weight percent of water in the liquid phase in said column, maintaining the reflux ratio at from 0.07 to 0.20 to one, heating the said acrylonitrile and said water, and taking off as a distillate aqueous acrylonitrile, the ratio of acrylonitrile to acetonitrile in said distillate being greater than that present in the original mixture.

2. A process for the purification of acrylonitrile containing acetonitrile as an impurity which comprises feeding the impure acrylonitrile into a fractionating column, introducing sufficient water into said column at a point above the point of introduction of the acrylonitrile to provide at least about 93 weight percent of water in the liquid phase in said column, heating the said acrylonitrile and said water, taking off as a distillate aqueous acrylonitrile, the ratio of acrylonitrile to acetonitrile in said distillate being greater than that present in the original mixture, condensing said distillate and allowing it to separate into an acrylonitrile and an aqueous phase, removing the acrylonitrile phase, and returning the aqueous phase to the column as reflux.

3. A process for the purification of acrylonitrile containing acetonitrile as an impurity which comprises feeding the impure acrylonitrile into a fractionating column, introducing sufficient water into said column at a point above the point of introduction of the acrylonitrile to provide at least about 93 weight percent of water in the liquid phase in said column, heating the said acrylonitrile and said water to maintain the temperature in the base of the column at about 95° C. and the temperature in the column below the water feed point at about 71° C., and taking off as a distillate aqueous acrylonitrile, the ratio of acrylonitrile to acetonitrile in said distillate being greater than that present in the original mixture.

4. A process for the purification of acrylonitrile containing acetonitrile as an impurity which comprises feeding impure acrylonitrile into a fractionating column, introducing sufficient water into the top of said column to provide at least 93 weight percent of water in the liquid phase in said column, heating the said acrylonitrile and said water, condensing the resulting aqueous acrylonitrile issuing from the top of said column to form a layer of acrylonitrile, decanting the acrylonitrile from the condensate, and removing water and said impurity from the bottom of said column.

5. A process for the purification of acrylonitrile containing acetonitrile as an impurity which comprises feeding the impure acrylonitrile into a fractionating column, introducing sufficient water into said column at a point above the point of introduction of the acrylonitrile to provide at least about 93 weight percent of water in the liquid phase in said column, heating the said acrylonitrile and said water, taking off as a distillate aqueous acrylonitrile, the ratio of acrylonitrile to acetonitrile in said distillate being greater than that present in the original mixture, and supplying sufficient heat to the column to avoid any condensation of acrylonitrile and the formation of an acrylonitrile liquid phase in the column.

6. A process for the purification of acrylonitrile containing acetonitrile as an impurity which comprises feeding the impure acrylonitrile into a fractionating column, introducing sufficient water into said column at a point above the point of introduction of the acrylonitrile to provide at least about 93 weight percent of water in the liquid phase in said column, heating the said acrylonitrile and said water, taking off as a distillate aqueous acrylonitrile, the ratio of acrylonitrile to acetonitrile in said distillate being greater than that present in the original mixture, and maintaining the temperature of the column below the water fed point at at least 71° C. to prevent the appearance in the column below the water fed point of an acrylonitrile liquid phase in the column.

References Cited
UNITED STATES PATENTS 2,415,662  2/1947  Teter et al. ---------- 203—97
2,681,306  6/1954  Kemp et al. ---------- 203—96

OTHER REFERENCES

Benedict et al.: "Extractive and Azeotropic Distillation" from Transactions of American Institute of Chemical Engineers, June 24, 1945 (pp. 353–370).

WILBUR L. BASCOMB, JR., Primary Examiner

U.S. Cl. X.R.

203—39, DIG 3; 260—465.3, 465.9